United States Patent [19]

Thibodeau

[11] 4,229,787

[45] Oct. 21, 1980

[54] FLYBACK TRANSFORMER

[75] Inventor: Leslie N. Thibodeau, Indianapolis, Ind.

[73] Assignee: RCA Corporation, New York, N.Y.

[21] Appl. No.: 965,109

[22] Filed: Nov. 30, 1978

[51] Int. Cl.[2] .............................................. H02M 7/06

[52] U.S. Cl. ...................................... 363/126; 336/69; 315/411; 363/146

[58] Field of Search .................... 336/69, 70; 363/126, 363/144, 146; 315/411

[56] References Cited

U.S. PATENT DOCUMENTS

| | | | |
|---|---|---|---|
| 3,657,632 | 4/1972 | Miyoshi | 363/126 X |
| 3,886,434 | 5/1975 | Schreiner | 336/69 X |
| 3,894,270 | 7/1975 | Manske | 336/69 X |
| 3,936,719 | 2/1976 | Miyoshi et al. | 363/126 |
| 3,947,749 | 3/1976 | Kimura et al. | 363/126 |

*Primary Examiner*—William M. Shoop
*Attorney, Agent, or Firm*—E. M. Whitacre; P. J. Rasmussen; J. J. Laks

[57] ABSTRACT

A flyback transformer includes a high voltage winding with a first rectifier coupled to the high voltage lead and a second rectifier coupled to the ground return lead. The rectifiers are poled in the same direction to conduct beam current and block the DC current path in the winding during the trace interval. The distributed capacity forms a capacitive voltage divider and developes an intermediate DC voltage in the high voltage winding. The intermediate DC voltage developed at an intermediate AC null terminal of the high voltage winding is selectively adjusted by structure which is selectively capable of adding sufficient distributed capacity to appropriately change the capacitive voltage division ratio.

5 Claims, 5 Drawing Figures

FLYBACK TRANSFORMER

BACKGROUND OF THE INVENTION

This invention relates to high voltage or flyback transformers for cathode ray tubes.

Typically, to obtain the ultor voltage for a cathode ray tube of a television receiver, the primary winding of a flyback transformer is coupled to a horizontal deflection circuit. A high voltage winding is magnetically coupled to the primary winding and the retrace pulse developed in the high voltage winding is rectified by a high voltage diode to produce the ultor voltage.

To obtain an intermediate DC voltage such as required for the focus or screen electrode of the cathode ray tube, for example, the high voltage may be divided down, or the retrace pulse in another flyback winding or at an intermediate tap point of the high voltage winding may be rectified and filtered. Other high voltage circuits include a second intervening rectifier coupled between a common ground return and the ground lead of the high voltage winding. This intervening ground rectifier is poled in the same direction as the high voltage rectifier. Capacitive voltage division creates an intermediate DC voltage to which the high voltage winding is referenced. If the focus voltage tap point is located at the AC null point for the retrace pulses, no rectification is necessary to obtain a DC focus voltage which approximately equals the intermediate DC voltage.

Focus voltages, however, typically equal one-fourth to one-third of the high voltage retrace pulse voltage. To change the DC intermediate voltage to the required value, external discrete capacitors have been used to change the capacitive voltage division and thus also the AC null point. An external capacitor may be coupled between the focus tap point and the common ground return, or an external capacitor may be coupled across the intervening ground rectifier electrodes. The first mentioned external capacitor must be able to withstand the DC voltage stress at the fosuc point and the second mentioned external capacitor must be able to withstand the AC voltage stress of the retrace pulse developed across the intervening ground diode. Both capacitors are relatively large and expensive. It is desirable to design a high voltage transformer which will eliminate such external capacitors entirely.

Television receivers may use several different cathode ray tube types which require different focus voltages to be coupled to the focus electrode, depending on the type of cathode ray tube used. It is desirable to design a high voltage transformer which may be commonly used with each of the several cathode ray tube types and incorporate structure which permits selective adjustment of the focus voltage without requiring different or redesigned housings.

SUMMARY

A high voltage transformer includes a high voltage winding with a first rectifier coupled to the high voltage lead through connecting termination structure and a second rectifier coupled to a second lead of the high voltage winding. Both rectifiers are poled in the same direction and block the DC current path in the high voltage winding when the rectifiers are reverse biased. An intermediate DC voltage is developed in the high voltage winding at an intermediate AC null terminal entirely by means of distributed capacity voltage division. An additional distributed capacity developing structure connecting the second rectifier and the second lead of the high voltage winding adds a selected amount of distributed capacity to the capacitive voltage division to selectively adjust the value of the intermediate DC voltage.

DESCRIPTION OF THE INVENTION

Figure 1:
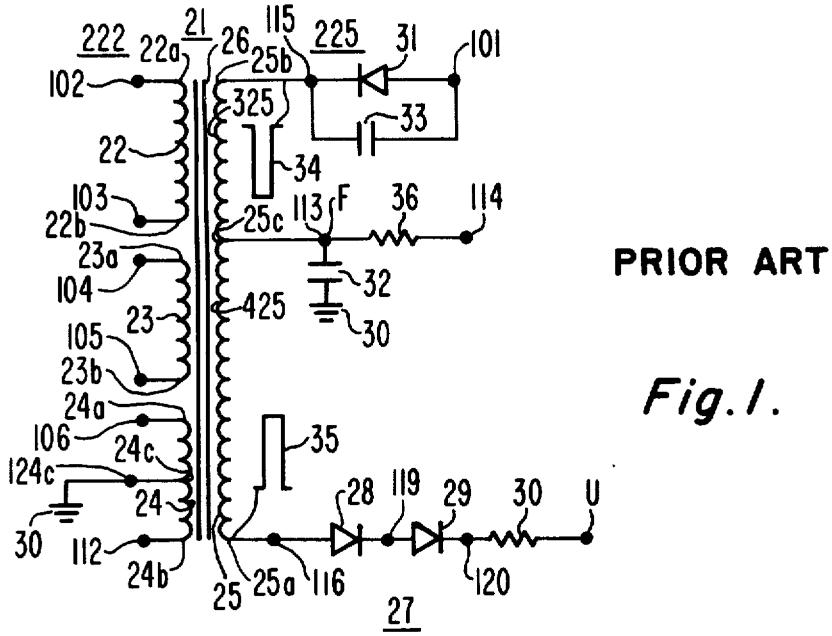
FIG. 1 illustrates a prior art electrical schematic of a flyback transformer circuit.

FIG. 1 illustrates an electrical schematic of a prior art flyback or horizontal output transformer 21 including associated high voltage generating circuitry. Flyback transformer 21 includes a primary winding assembly 222, including primary winding 22 with lead wires *22a* and *22b*, and associated secondary windings 23 and 24 with respective lead wires *23a*, *23b*, *24a*, and *24b*. Conventional termination of the lead wires of windings 22-24 to other cathode ray tube and television receiver circuitry is indicated by solder terminals 102-106 and 112. Secondary winding 24 includes, illustratively, a tap wire lead *24c*, conventionally terminated, as indicated by the solder terminal *124c* to a common ground current return 30. Ground return 30 may, for example, comprise the metal chassis of a television receiver, the chassis being, for example, electrically isolated from the AC line mains supply.

Flyback transformer 21 also includes a high voltage assembly 225 for generating an ultor accelerating potential for beam current. High voltage assembly 225 comprises a high voltage winding 25 magnetically coupled to primary winding 22 by a ferromagnetic core 26.

A first high voltage rectifier arrangement 27 comprising diodes 28 and 29 is poled to conduct during the horizontal retrace intervals to rectify horizontal retrace pulses and couple them through a resistor 30 to an ultor terminal U, at which terminal a DC ultor accelerating potential is developed by charging and filtering of the ultor capacitance, not shown. High voltage termination to provide electrical continuity between the high voltage lead wire *25a* of high voltage winding 25 and the anode lead wire of diode 28 of high voltage rectifier 27 is generally indicated by a solder terminal 116. Termination between the two diodes, diode 29 and resistor 30 and ultor terminal U are generally indicated respectively by solder terminals 119, 120, and U.

A second rectifier 31, comprising, illustratively, a diode, includes an anode lead wire electrically connected to a terminal 101 and a cathode lead wire electrically connected to a terminal 115. Terminal 115 is also connected to a second wire lead *25b* of high voltage winding 25. The termination structure for diode 31 and high voltage winding 25 is generally indicated by solder terminals 101 and 115.

Terminal 101 may be DC coupled to ground return 30 or to a DC voltage source. With rectifier 31 poled in the same direction as high voltage rectifier 27, the replenishing DC charging current flows during retrace, when both rectifiers are conducting, from terminal 101 through rectifier 31, high voltage winding 25, rectifier 27, resistor 30, to ultor terminal U to charge the cathode ray tube capacitance.

A capacitive voltage divider exists between terminals 101 and the ultor terminal U. As illustrated in FIG. 1, a discrete external capacitor 32 is coupled between a terminal 113 and ground return 30. Terminal 113 is coupled to an intermediate tap lead wire 25*c* of high voltage winding 25. Terminal 113 is thereby DC coupled to terminal 115 through winding portion 325 and DC coupled to terminal 116 through winding portion 425. Supplementarily or alternatively, a discrete external capacitor 33 may be coupled across diode 31. The stray capacity between terminal 116 and ultor terminal U completes the capacitive voltage divider.

During trace, rectifiers 27 and 31 are reversed biased and block the DC current path in high voltage winding 25. The ultor potential at terminal U is now developed across the aforementioned capacitive voltage divider coupled across terminals 101 and U. In effect then, during trace, an intermediate DC voltage is developed across capacitors 32 and 33 which, DC-wise, are parallely connected. Thus, an intermediate DC voltage is also coupled to high voltage winding 25.

Intermediate tap location 25*c* determines the amplitudes of the trace and retrace voltages developed in winding portions 325 and 425 according to the turns ratio of the two portions, with opposite polarity retrace pulses 34 and 35 being developed respectively at terminals 115 and 116, referenced to the voltage at intermediate terminal 113. With proper selection of tap location 25*c* and selection of values for capacitors 32 and 33 the voltages at the tap location during trace and retrace are equal, with the trace voltage and DC intermediate voltage equaling approximately the retrace voltage. Tap location 25*c*, therefore, is established as an AC null point for the AC voltage developed in high voltage winding 25, with substantially only an intermediate DC voltage being developed at terminal 113.

Because only DC voltage is developed, terminal 113 may function as a focus tap terminal F for providing an intermediate DC focus voltage to the focus electrode of a cathode ray tube. As illustrated in FIG. 1, this voltage is coupled from terminal 113 through a resistor 36 to a terminal 114, which terminal may be coupled to the focus electrode through a wiper arm of a potentiometer, not illustrated, that is coupled to terminal 114.

Use of discrete capacitors to selectively adjust the capacitive voltage divider to obtain an intermediate DC focus voltage is a relatively expensive solution for ensuring that the correct DC focus voltage is developed at terminal 113. Capacitor 32 must be capable of withstanding a relatively high DC voltage. Capacitor 33, besides being subjected to a DC voltage is also subjected to the even more stressufl AC voltage of retrace pulse 34. This AC voltage causes capacitor 33 to be relatively prone to breakdown.

Eliminating both capacitors 32 and 33 would establish a capacitive voltage divider between terminal 101 and terminal U that is a function of the inherent stray capacitance associated with conventional flyback transformer 21 structure. Such stray capacity is difficult to control accurately and the relatively exacting DC focus voltage required at terminal 113 will be difficult to precisely obtain or to selectively adjust for the different cathode ray tubes used.

The flyback transformer 21 structure embodying the invention, and illustrated in FIGS. 2-5, incorporates structure which eliminates the necessity of using discrete external capacitors, such as capacitors 32 and 33 of FIG. 1, and permits accurate and selective adjustment of the developed intermediate DC focus voltage.

Figure 2:
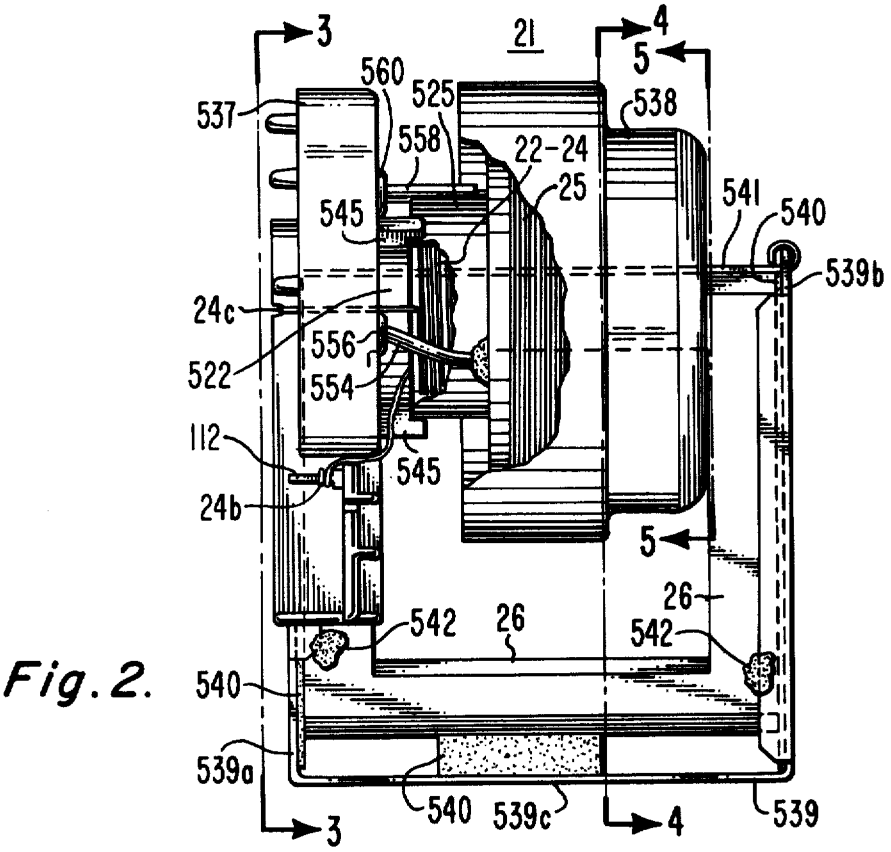
FIG. 2 illustrates a side view, partially in breakout, of a flyback transformer structure embodying the invention.
Figure 3:
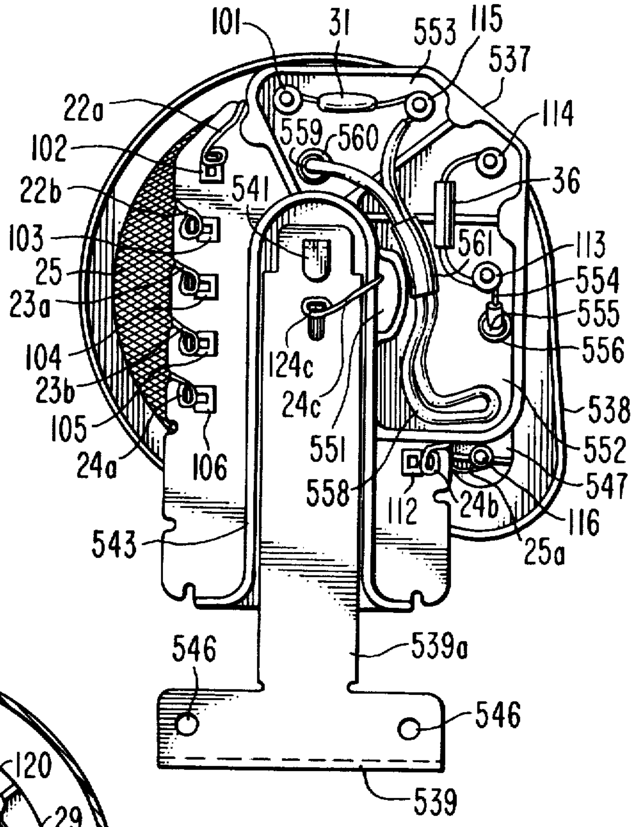
FIG. 3 illustrates a left end view along the lines 3—3 of the flyback transformer structure illustrated in FIG. 2.

As illustrated in the various views of FIGS. 2-5, flyback transformer 21 includes a primary bobbin 522 on which a primary winding 22 and secondary windings 23 and 24 are, illustratively, layer wound. A first component housing 537 is integrally formed with primary bobbin 522 and holds various electrical components and termination structure at one end of the housing, as illustrated in FIG. 3.

Figure 4:
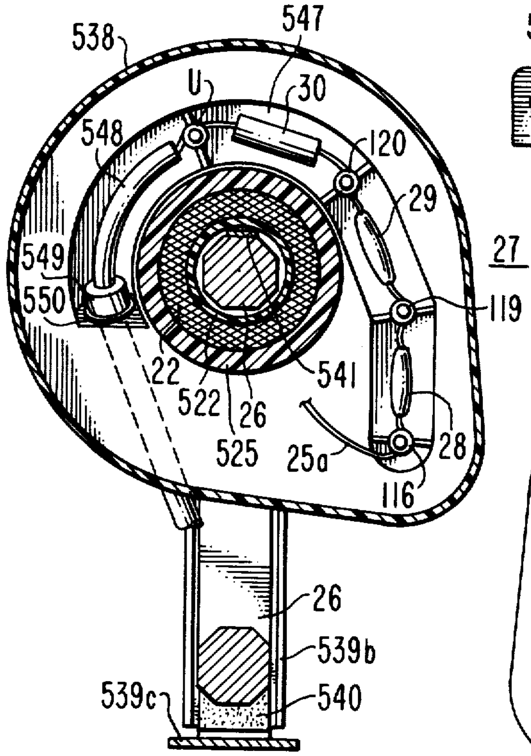
FIG. 4 illustrates a cross-sectional view along the lines 4—4 of the flyback transformer structure illustrated by FIG. 2.

A high voltage bobbin 525 includes a high voltage winding 25 illustratively layer-wound and assembled around the bobbin. A second component housing 538 is integrally formed with high voltage bobbin 525 and holds still other electrical components and termination structure at one end of the housing, as illustrated in FIG. 4.

Figure 5:
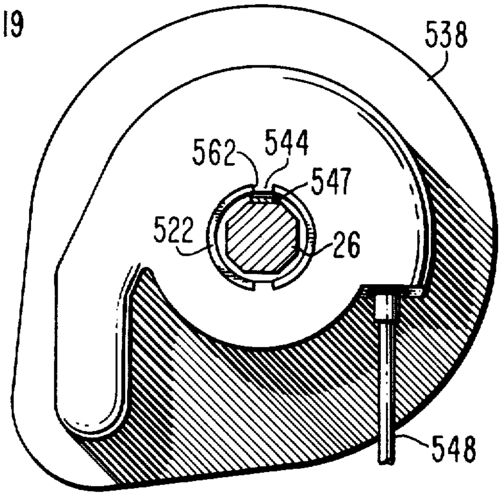
FIG. 5 illustrates a cross-sectional view along the line 5—5 of FIG. 2.

As illustrated in the view of FIG. 5 along lines 5—5 of FIG. 2, high voltage bobbin and housing 525 and 538 are angularly oriented with respect to primary bobbin 522 and housing 537 by a tongue 544 formed in high voltage housing 538 and a corresponding groove 562 formed in an end of primary bobbin 522. As illustrated in the side view of FIG. 2, correct lateral placement of primary bobbin 522 with respect to high voltage bobbin 525 is accomplished by spacers 545 formed in primary bobbin 522 that abut an end of high voltage bobbin 525.

A rectangular ferromagnetic core 26, comprising 2 C-core pieces, is placed through apertures in primary and high voltage bobbins 552 and 525 and primary and high voltage housings 537 and 538. A U-shaped metal bracket 539 includes channels along both left and right legs 539*a* and 539*b*, into which channels core 26 is placed. Core 26 is resiliently wedged against legs 539*a* and 539*b* and bottom plate 539*c* of metal bracket 539 by cushions 540 interposed between core 26 and bracket 539. Core 26 is secured to bracket 539 by a metal strip 541 located over the top leg of the core. Metal bracket 539 is secured to primary housing 537 by press-fitting and gluing the left leg 539*a* of bracket 539 into the walls of a channel 543 formed in an end of the housing.

Lumps of electrically conductive and adhesive compound 542 provide electrical connection between core 26 and metal bracket 539. Screw holes 546 are formed in left leg 539*a* and bottom plate 539*c* to secure flyback transformer 21 to the metal television receiver chassis by means of sheet metal screws, not illustrated. With metal bracket 539 secured to the metal chassis, bracket 539 functions as an AC line isolated ground return 30.

As illustrated in FIG. 4, metal electrical terminals 116, 119, 120 and U are located in an inner recess 547 of high voltage housing 538. A high voltage rectifier arrangement 27 is connected between terminals 116 and 120. Rectifier 27 comprises a diode 28 with an anode lead wire wrapped around terminal 116 and a cathode lead wire wrapped around terminal 119 and a diode 29 with an anode lead wire wrapped around terminal 119. A resistor 30 includes lead wires wrapped around terminal 120 and terminal U. An ultor anode lead wire 548 has one end wrapped around terminal U. The other end of anode lead wire 548 extends through a grommet 549 and an aperture 550 in high voltage housig 538 to terminate in a conventional ultor anode cup arrangement, not illustrated. The high voltage lead wire 25*a* of high voltage winding 25 is brought out from the winding build-up area, not shown, and wrapped around terminal 116.

As illustrated in FIG. 3, lead wires 22*a*, 22*b*, 23*a*, 23*b*, 24*a*, and 24*b* of primary and secondary windings 22, 23, and 24 are brought out from the winding build-up area and wrapped around the right angle flanges of metal eyelet terminals 102–106, and 112. A ground tap lead wire 24*c* of winding 24 is brought out through an aperture 551 in primary housing 537 and soldered to a flange terminal 124*c* formed in metal bracket leg 539*a*.

Located in a recess 552 of primary housing 537 is an intermediate DC voltage terminal 113. As illustrated in FIGS. 2 and 3, one end of a wire conductor 554 extends through an aperture 555 in primary housing 537 and through a grommet 556 and is wrapped around terminal 113. The other end of wire conductor 554 is terminated at the intermediate DC tap wire 25*c* of high voltage winding 25, as illustrated in FIG. 2.

As illustrated in FIG. 3, a resistor 36 includes lead wires wrapped around terminal 113 and a terminal 114. Terminal 114 may then be electrically connected to the focus electrode of cathode ray tube.

A second rectifier diode 31, is located in a recess 553 in primary housing 537. The anode lead wire of rectifier 31 is wrapped around a terminal 101. The cathode lead wire of rectifier 31 is wrapped around a terminal 115. Terminal 101 may be DC connected to ground or to a DC voltage supply.

With flyback transformer 21 constructed as described above, and the components electrically connected also as described above, rectifiers 27 and 31 will be poled in the same direction to conduct current DC charging to the ultor terminal during retrace. During the trace interval, rectifier 27 and 31 will be reverse biased. With no external voltage divider capacitors connected to the flyback transformer, the capacitive voltage division necessary to develop an intermediate DC focus or screen electrode voltage at terminal 113 is formed entirely by the distributed capacity associated with the transformer structure of FIGS. 2–5.

A feature of the invention is to provide flyback transformer 21 with additional distributed capacity forming structure which will enable the intermediate DC focus or screen voltage to be selectively and accurately adjusted over a sufficiently wide range to permit the use of a single type of flyback structure with different cathode ray tubes. As illustrated in FIG. 3, the additional capacity forming structure comprises an extended conductor loop 558. One end of extended conductor loop 558 is wrapped around terminal 115, to which the cathode lead wire of rectifier 31 is also connected. As illustrated in FIGS. 2 and 3, the other end of extended conductor loop 558, is brought through an aperture 559 in primary housing 537, through a grommet 560, and is terminated at the start lead wire 25*b* of high voltage winding 25. A sleeve 561 around conductor loop 558 prevents the loop from contacting other electrical components and wires in primary housing 537. Extended conductor loop 558 is formed, illustratively, of an inner copper conductor wire and an outer insulating sheath of silicone rubber, for example.

The additional distributed capacity to ground provided by extended conductor loop is a function of the length of conductor wire used. This additional capacity is coupled to terminal 115, at the cathode of diode 31, where an AC retrace pulse is also developed. At this location, the focus voltage is relatively sensitive to capacity changes. Selective adjustment of the length of extended conductor loop 558 can then vary the focus voltage, typically, by up to 800 volts. Had an external capacitor been used at terminal 115, it would have been subject to increased breakdown due to the AC voltage developed at terminal 115. Using extended conductor loop 558, little likelihood exists of the breakdown of the conductor insulating sheath.

After assembly of transformer 21, all the cavities or recesses of the structure are potted with an insulating material such as silicone rubber to prevent corona discharge and breakdown.

Thus, by providing flyback transformer 21 with additional distributed capacity forming structure at terminal 115, a reliable, less costly, transformer is obtained, requiring no external voltage dividing capacitors. The transformer is capable of being used with different cathode ray tubes, and the focus voltage is readily and selectively adjustable for particular use.

What is claimed:

1. A high voltage structure, comprising:
   - a high voltage winding adapted for coupling to a source of alternating current voltage for developing a high voltage in said high voltage winding;
   - a first rectifier poled to conduct current;
   - high voltage termination means connecting said first rectifier and a high voltage lead of said high voltage winding for providing electrical continuity between said high voltage winding and said first rectifier;
   - a second rectifier poled in the same direction as said first rectifier, said first and second rectifiers blocking the DC current path in said high voltage winding during a first polarity interval of said alternating current voltage for developing an intermediate DC voltage in said high voltage winding entirely by means of distributed capacitive voltage division for establishing an AC null point at an intermediate DC terminal of said high voltage winding; and
   - additional distributed capacity developing structure connecting said second rectifier and a second lead of said high voltage winding for providing sufficient additional distributed capacity to selectively adjust said capacitive voltage division for selectively adjusting the value of said intermediate DC voltage.

2. A structure according to claim 1 wherein an AC voltage is developed at a terminal of said second rectifier.

3. A structure according to claim 2, including termination means for connecting said intermediate DC terminal to an electrode of a cathode ray tube for providing said intermediate DC voltage to said electrode.

4. A structure according to claim 3, wherein said source of alternating current voltage comprises a primary winding coupled to a horizontal deflection circuit.

5. A structure according to claim 4, wherein said additional distributed capacity developing structure comprises an extended conductor loop.

* * * * *